US012586957B2

(12) United States Patent
Demaratos

(10) Patent No.: US 12,586,957 B2
(45) Date of Patent: Mar. 24, 2026

(54) HIDDEN RELEASABLE BARCODE OR QR CODE FOR INDICATING MATING OR NON-MATING OF TWO ELEMENTS, AND OPERATION THEREOF

(71) Applicant: J.S.T. CORPORATION, Farmington Hills, MI (US)

(72) Inventor: David Demaratos, Wixom, MI (US)

(73) Assignee: J.S.T. CORPORATION, Farmington Hills, MI (US)

( * ) Notice: Subject to any disclaimer, the term of this patent is extended or adjusted under 35 U.S.C. 154(b) by 384 days.

(21) Appl. No.: 18/104,714

(22) Filed: Feb. 1, 2023

(65) Prior Publication Data

US 2024/0258746 A1    Aug. 1, 2024

Related U.S. Application Data

(60) Provisional application No. 63/395,249, filed on Aug. 4, 2022.

(51) Int. Cl.
H01R 13/641 (2006.01)
G06K 19/06 (2006.01)
(52) U.S. Cl.
CPC ..... H01R 13/641 (2013.01); G06K 19/06037 (2013.01)
(58) Field of Classification Search
CPC ........................... H01R 13/641; H01R 13/639; H01R 13/6272; G06K 19/06028; G06K 19/06037
USPC .................... 439/489, 135, 138–139; 285/93
See application file for complete search history.

(56) References Cited

U.S. PATENT DOCUMENTS

| | | | |
|---|---|---|---|
| 4,534,607 | A | 8/1985 | Tomsa |
| 9,583,860 | B1 | 2/2017 | Dewitte |
| 10,855,032 | B1 | 12/2020 | Davila Morales |
| 2014/0017036 | A1 | 1/2014 | Everard |
| 2015/0318640 | A1* | 11/2015 | Gibeau ................ H01R 13/641 |
| | | | 439/489 |
| 2016/0294109 | A1 | 10/2016 | Shindo |
| 2021/0111519 | A1 | 4/2021 | Schneider |

(Continued)

OTHER PUBLICATIONS

International Search Report for International Application No. PCT/US2023/012730 dated May 16, 2023 (3 sheets).

(Continued)

*Primary Examiner* — Tulsidas C Patel
*Assistant Examiner* — Thaslimur Rahman
(74) *Attorney, Agent, or Firm* — Kratz, Quintos & Hanson, LLP

(57) ABSTRACT

A hidden releasable barcode or QR code for indicating mating or non-mating of two elements, which includes a concealing feature which indicates the non-mating of said two elements, and an indicating feature which indicates the mating of said two elements. The concealing feature and the indicating feature are one and the same structure with no relative motion between the concealing feature and the indicating feature. The concealing feature is an upper side of the rotatable platter, while the indicating feature is an underside of the rotatable platter having the barcode or QR code thereon. When a rotatable platter becomes unblocked, a spring or a mechanical linkage rotates the platter from the upper side of the platter (concealing feature) to the underside of the platter containing thereon the barcode or the QR code (indicating feature).

21 Claims, 9 Drawing Sheets

(56) References Cited

U.S. PATENT DOCUMENTS

| 2021/0396336 | A1 | 12/2021 | Schroter | |
| 2022/0003347 | A1 | 1/2022 | Barthel | |
| 2023/0079583 | A1* | 3/2023 | Kanbara | .......... H01R 13/62955 |
| | | | | 439/489 |
| 2024/0413579 | A1* | 12/2024 | Wimmer | .............. H01R 13/465 |

OTHER PUBLICATIONS

Written Opinion of the International Searching Authority for International Application No. PCT/US2023/012730 dated May 16, 2023 (5 sheets).

* cited by examiner

ROTATABLE BARCODE PLATTER (10) SHOWING UPPER SIDE (30) OF PLATTER (10)

MECHANICAL LINKAGE (80)

CPA DEVICE (8)

ROTATABLE BARCODE PLATTER (10) REVEALING BARCODE (50) ON UNDERSIDE (60) OF PLATTER (10)

MECHANICAL LINKAGE (80)

CPA DEVICE (8)

HIDDEN RELEASABLE BARCODE OR QR CODE FOR INDICATING MATING OR NON-MATING OF TWO ELEMENTS, AND OPERATION THEREOF

CROSS-REFERENCE TO RELATED APPLICATION

This patent application claims priority to U.S. Provisional Patent Application No. 63/395,249 filed Aug. 4, 2022, which is hereby incorporated herein by reference in its entirety.

BACKGROUND OF THE INVENTION

A connector 10 of a connector system 100 of U.S. Pat. No. 9,583,860 is illustrated in FIGS. 6 and 7 therein. A lever 134 is pivotably coupled to a housing 118, the lever 134 having a segment 204 that seals or hides a barcode label 112 mounted, affixed, or drawn to a side portion of the housing 118. Illustrated in FIG. 6 of U.S. Pat. No. 9,583,860 is a structural arrangement whereby the housing 118 is not fully mated to a mating connector (e.g., a second connector 104 shown in FIG. 3). The barcode label 112 is shown in phantom in FIG. 6 because it is concealed by the segment 204 of the lever 134. A structural arrangement where the housing 118 is fully mated to the mating connector 104 is as shown in FIG. 7 when the lever 134 is pivoted to the closed position, such that a recessed portion 206 of the lever 134 aligns with the barcode label 112 and exposes the barcode label 112 on the housing 118. The barcode label 112 is thus now viewable through the recessed portion 206 of the lever 134.

In other words, there is a specifically defined "concealing feature" in U.S. Pat. No. 9,583,860, which is made up of the segment 204 of the lever 134 that conceals the barcode label 112 when the housing 118 is not fully mated to the mating connector 104. As described in U.S. Pat. No. 9,583,860, the so-called "conceiling feature" consists of the segment 204 of the lever 134 that conceals the bar code label 112 when the housing 118 is not fully mated to the mating connector 104. As described in U.S. Pat. No. 9,583,860, the so-called "concealing feature" consists of the segment 204 of the lever 134, which is structurally and functionally separate or independent from the barcode label 112 that it conceals.

In the present invention, a rotatable barcode platter is provided. The conceiling feature of the present invention is the upper side of the rotatable barcode platter, while the indicating feature of the present invention is the underside of the rotatable platter having thereon a barcode or a QR code, the conceiling and indicating features of the present invention being on the same structure because the upper side of the platter and the underside of the platter, containing the barcode or the QR code, are on the same platter.

Moreover, in U.S. Pat. No. 9,583,869, the indicating feature (i.e., the barcode label 112) and the concealing feature (i.e., the segment 204 of the lever 134) are moveable relative to each other between a concealed position and an exposed position. However, in the instant invention, the concealing feature (i.e., the upper side of the rotatable barcode platter) and the indicating feature (i.e., the underside of the rotatable barcode platter having thereon the barcode or QR code) are of one and the same structure and do not move relative to each other because, as noted above, the upper side and the underside containing the barcode or QR code are on the same rotatable platter.

SUMMARY OF THE INVENTION

A hidden releasable barcode or QR code for indicating mating or non-mating of two elements of this invention includes a rotatable barcode or QR code platter, the rotatable barcode or QR code platter being the conceiling feature of the present invention. It is to be noted that barcode platter and QR code platter are interchangeable depending on whether the platter carries a barcode or a QR code thereon. The rotatable barcode or QR code platter is, for the most part, carries the indicating feature (i.e., the underside of the platter containing thereon the barcode or the QR code) because the upper side and the underside of the platter, containing the barcode or the QR code, are on the same barcode or QR code platter. In other words, in the instant invention, the concealing feature (i.e., the upper side of the rotatable barcode or QR code platter) and the indicating feature (i.e., the underside of the rotatable platter containing thereon the barcode or QR code) are of one and the same structure or element, and do not move relative to each other because the upper side and the underside, containing the barcode or QR code, are parts of the same rotatable barcode or QR code platter. The rotatable barcode or QR code platter is activated or made operable by a spring (e.g., for example, a torsion-type spring operably connected, for example, to the platter and a CPA device, although the activation of the rotatable barcode or QR code platter is not limited to the use of a spring of the type used and described in this invention. Alternatively, a coil spring or a combination of coil springs, operably coupled to the platter and CPA device, may be used for the spring in this invention.

Also, instead of the type of spring used and described in this invention, and the above-mentioned coil spring or a combination of coil springs, a mechanical linkage, operably coupled to the platter and the CPA device, may also be used.

The rotatable barcode or QR code platter is, for example, mounted onto a female housing assembly, and in a concealed position partially beneath a connector position assurance (CPA) device. When a male housing assembly mates with the female housing assembly, and the mating is at a pre-lock (or pre-mate) position, the CPA device is unable to move forward (i.e., move forward towards the locking position); and thus, the rotatable barcode or QR code, partially beneath the CPA device, remains at a concealed position. When the male and female connector assemblies become fully mated, the CPA is then allowed to move forward to place the male and female connector assemblies at a full-lock (or mated) position. The movement of the CPA device forward places the CPA device in a locked position and allows the rotatable barcode or QR code to be released from its concealed position; and the spring-loaded barcode or QR code is then allowed to rotate revealing the barcode or QR code on the underside of the barcode or QR code platter. Also, instead of a spring-activated barcode platter, the barcode or QR code platter may be rotated by a mechanical linkage between the CPA device and the barcode or QR code platter so as to similarly permit the barcode or QR code platter to rotate, when the CPA device is moved to its locked position to place or engage the male and female connector assemblies at a full-lock (or mated) position. Upon the rotation of the barcode or QR code platter by the mechanical linkage between the CPA device and the barcode or QR code platter, the barcode or QR code platter is released from its concealed position by rotating the barcode or QR code platter, and thereby revealing the barcode or QR code on the underside of the barcode or QR code platter.

DETAILED DESCRIPTION OF THE PREFERRED EMBODIMENTS

Figure 1:
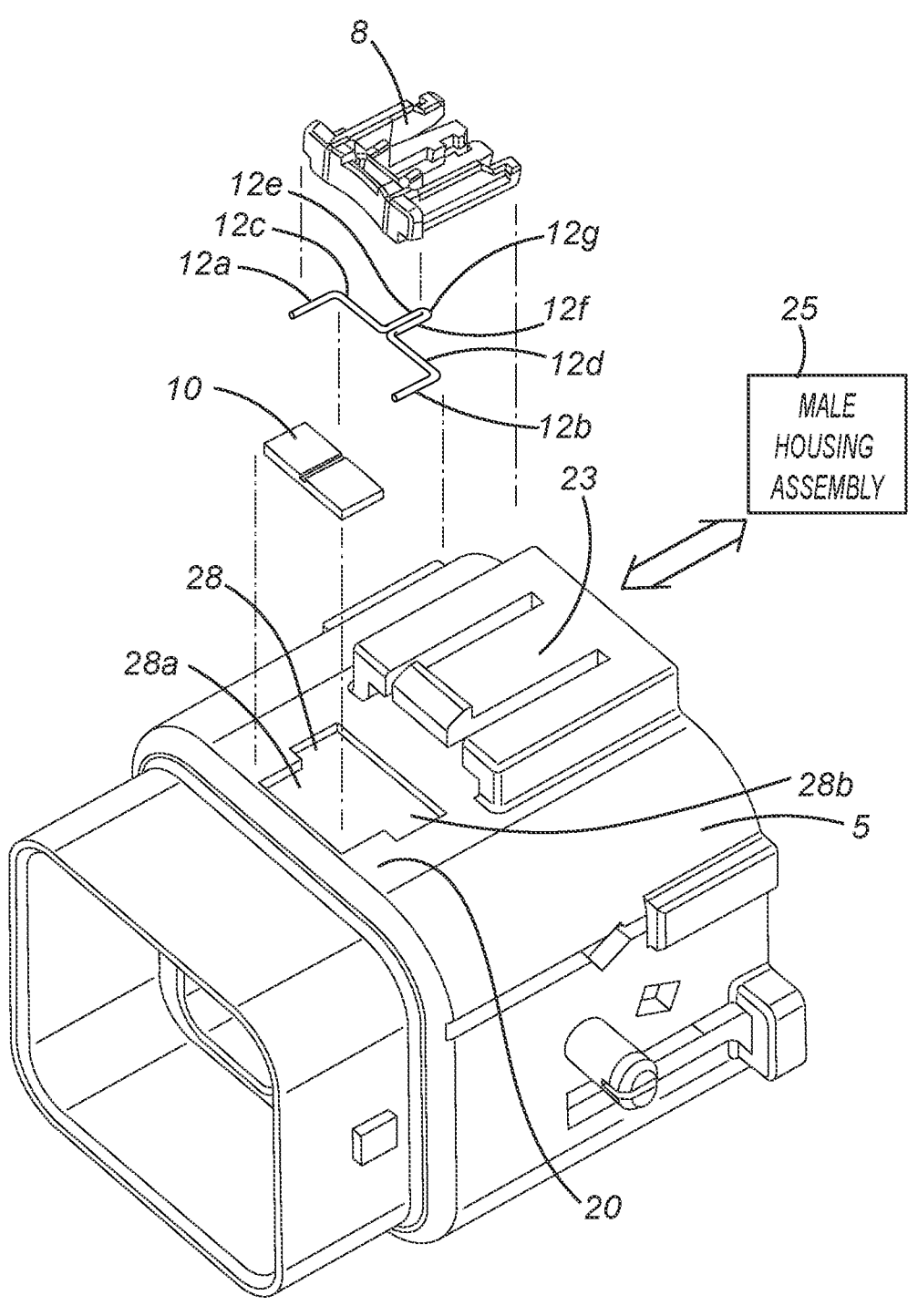
FIG. 1 is a perspective exploded view of a female housing assembly with a CPA device, along with a barcode (or QR code) platter and a platter-activating spring of this invention, the platter and the spring being in a position where the female housing assembly is at a pre-lock or pre-mate position with a male housing assembly, the CPA device being unable to move forward towards a locking position.

FIG. 1 is a perspective exploded view of a female housing assembly 5 with a CPA device 8, along with a barcode (or QR code) platter 10 and a platter-activating spring 12 of this invention, the platter 10 and the spring 12 being in positions where the female housing assembly 5 is at a pre-lock or pre-mate position (i.e., pre-lock or pre-mate position with the male housing assembly 25) where the CPA device 8 is unable to move forward towards a lock position.

As will be discussed in more detail below, the platter-activating spring 12 includes (see, FIG. 4) portions 12a, 12b, 12c, and 12d that make up a substantially U-shaped configuration with additional extended portions 12e, 12f extending substantially perpendicular from portions 12c, 12d, respectively. At a free end of the extended portions 12e, 12f of the spring 12 is a substantially U-shaped end portion 12g (see, FIG. 4).

On the upper surface 20 of the female housing assembly 5 is a CPA device retainer 23. Also, on the upper surface 20 of the female housing assembly 5 is a slot portion 28 that accommodates therein the spring 12 and the platter 10. As shown in FIG. 1 and as will be discussed in more detail below, the slot portion 28 is substantially comprised of a slot portion 28a and slot portion 28b.

Figure 2:
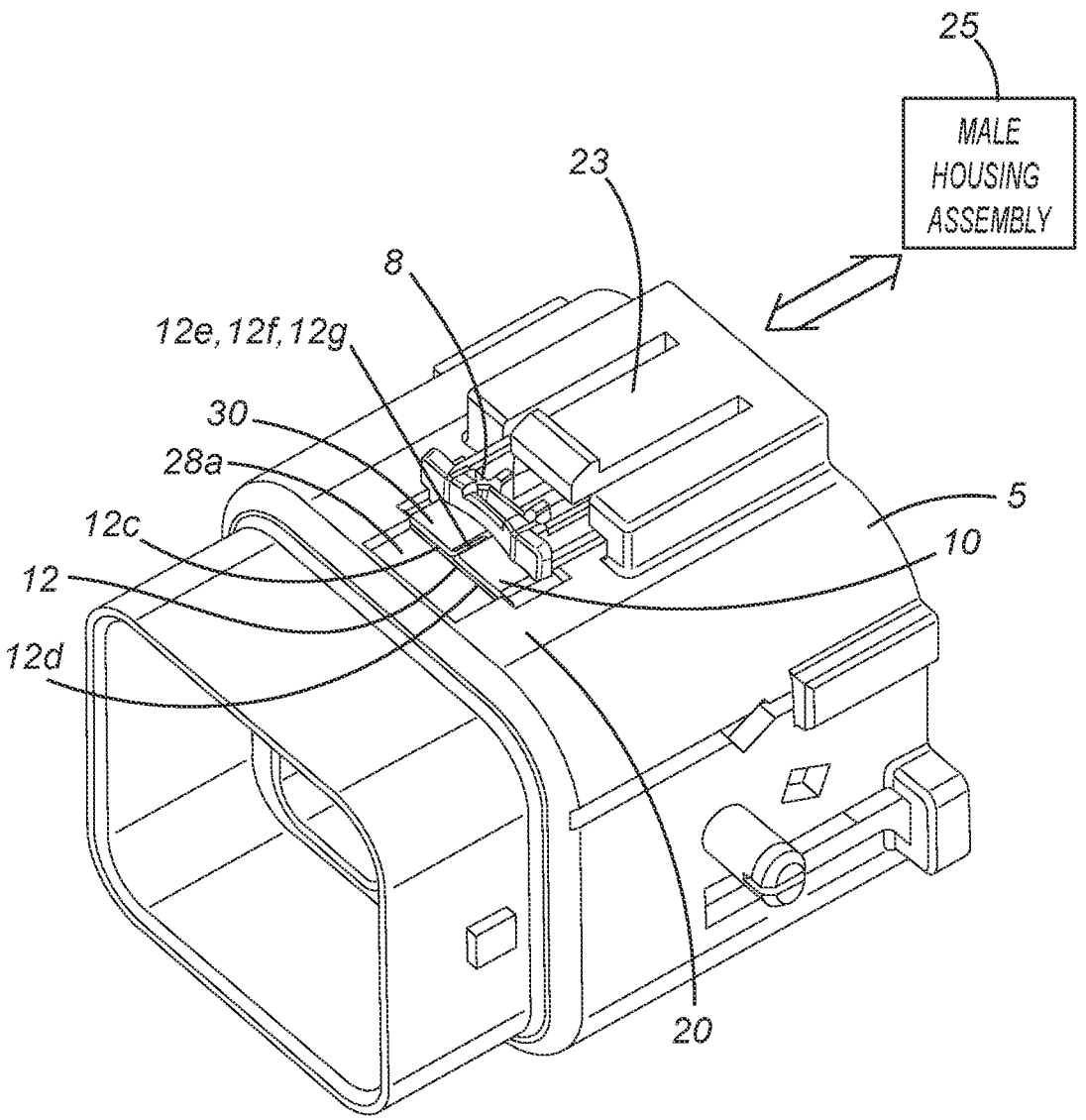
FIG. 2 is a perspective view of the female housing assembly mounted and assembled thereon the CPA device, the barcode (or QR code) platter, and the platter-activating spring, the female housing assembly being at a pre-lock or pre-mate position with the male housing assembly, the CPA device being unable to move forward towards the locking position with an upper side of the platter being shown.

FIG. 2 is a perspective view of the female housing assembly 5 mounted and assembled thereon the CPA device 8, the barcode (or QR code) platter 10, and the platter-activating spring 12, the female housing assembly 5 being at the pre-lock or pre-mate position (i.e., pre-lock or pre-mate position with the male housing assembly 25) with the male housing assembly 25, the CPA device 8 being unable to move forward towards a lock position with an upper side 30 of the platter 10 being shown. Here, the barcode 50 (see, FIGS. 6-8) is concealed and remains concealed when the CPA device 8 is unable to move forward towards a lock position, such that in this invention, the concealing feature for the barcode 50 is the rotatable barcode platter 10 showing its upper side 30, which, as later discussed, is the same structure on which the indicating feature (i.e., the barcode 50 being on the underside 60 of the platter 10) is a part of. As further discussed later, the concealing feature of this invention (i.e., the platter 10) and the indicating feature (i.e., the barcode 50) are of one and the same structure, and thus, do not move relative to each other (i.e., no relative motion between the two) because the barcode 50 is part of the rotatable barcode platter 10.

Figure 3:
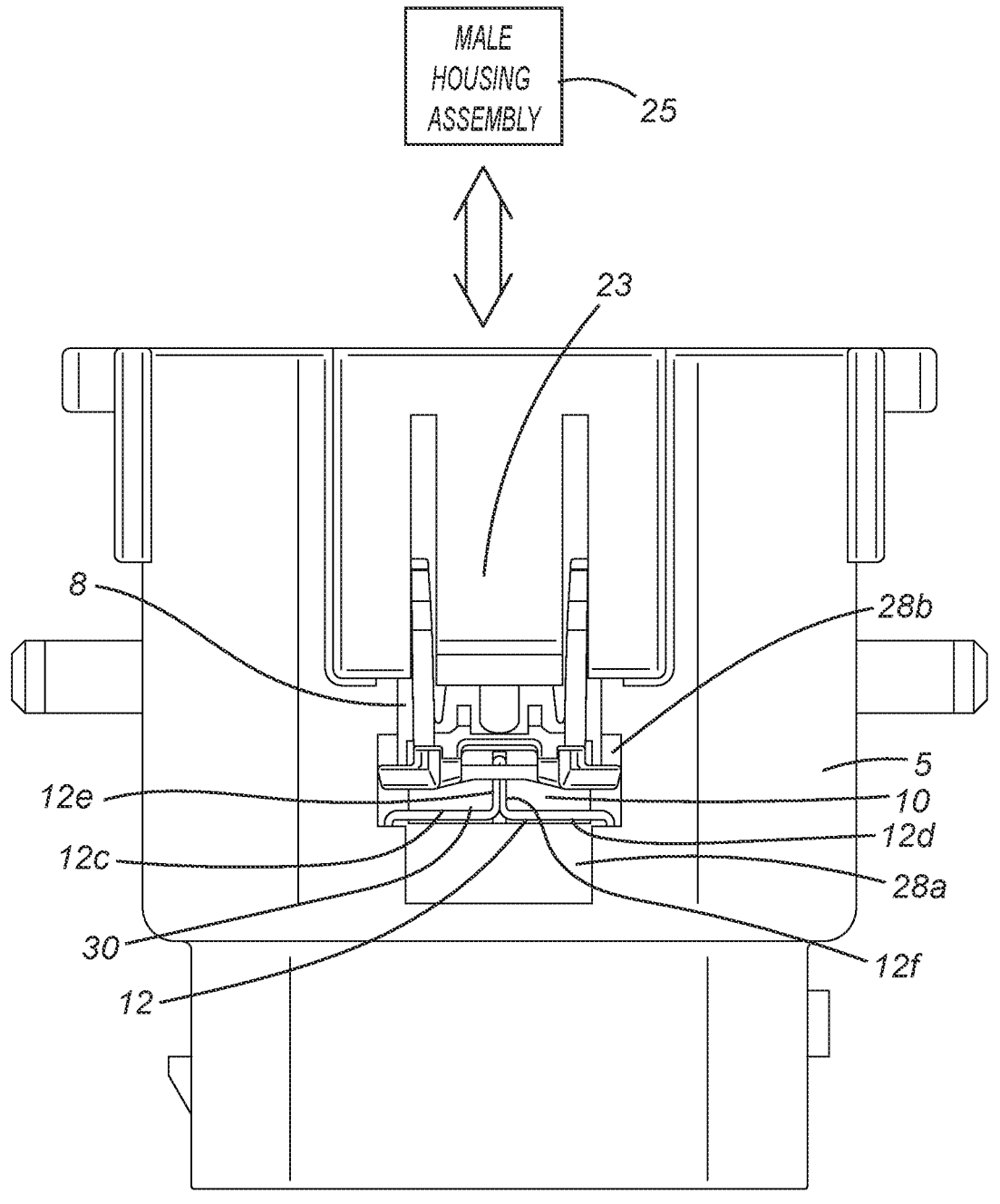
FIG. 3 is a top elevational view of the female housing assembly mounted and assembled thereon the CPA device, the barcode (or QR code) platter, and the platter-activating spring, the female housing assembly being at a pre-lock or pre-mate position with the male housing assembly, the CPA device being unable to move forward towards the locking position with the upper side of the platter being shown.

FIG. 3 is a top elevational view of the female housing assembly 5 mounted and assembled thereon the CPA device 8, the barcode (or QR code) platter 10, and platter-activating spring 12, the female housing assembly 5 being at a pre-lock or pre-mate position (i.e., pre-lock or pre-mate position with the male housing assembly 25), the CPA device 8 being unable to move forward towards the lock position with the upper side 30 of the platter 10 being shown. As illustrated in FIG. 3, the CPA device 8 covers the upper side 30 of the platter 10, and more importantly blocks the spring-activated barcode platter 10 from rotating from the slot portion 28b towards the slot portion 28a, which has not yet been occupied by the platter 10 when the CPA device 8 is at the pre-lock position. With the blocking of the spring-activated barcode platter 10 by the CPA device 8, as shown in FIG. 3, the barcode platter 10 acts as the concealing feature (i.e., the concealment of the barcode 50) of this invention. This conceiling feature of the invention indicates that the CPA device 8 is yet unable to move forward towards the lock position and the CPA device 8 remains at the pre-lock position, which means that the female housing assembly 5 and the male housing assembly 25 are at the pre-lock or the pre-mate position. Although not shown, slots, holes, or apertures at the slot portion 28b respectively accommodate the portions 12a, 12b of the spring 12 allowing the spring portions 12c, 12d to stay snug or firm within the slot portion 28b.

Figure 4:
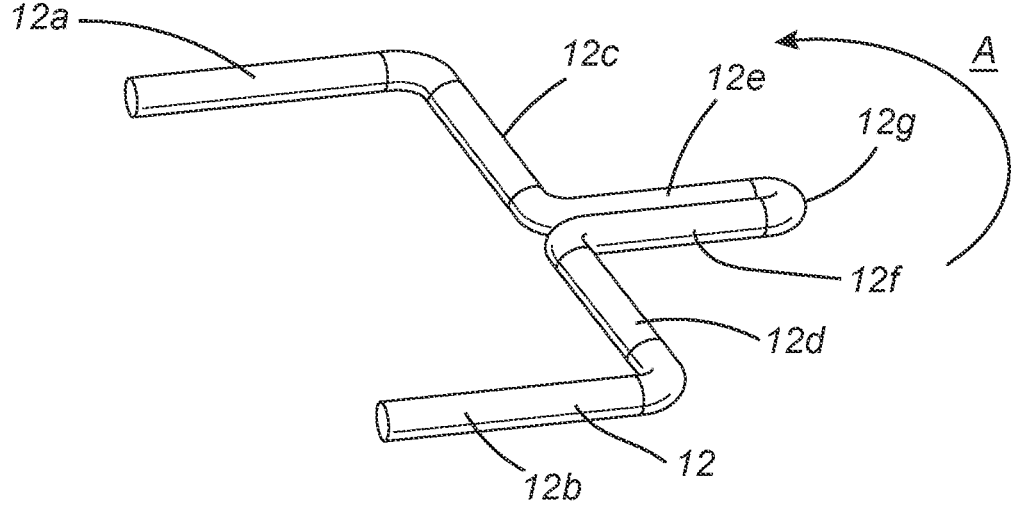
FIG. 4 is a perspective view of the platter-activating spring of this invention in a position ready to be assembled with and coupled to the upper side of the barcode (or QR code) platter.

FIG. 4 is a perspective view of the spring 12 of this invention in a position ready to be assembled with the upper side 30 of the barcode (or QR code) platter 10. More particularly, the spring 12 includes, as shown in FIG. 4, portions 12a, 12b, 12c, and 12d that make up a substantially U-shaped configuration with additional extended portions 12e, 12f extending substantially perpendicular from portions 12c, 12d, respectively. At a free end of the extended portions 12e, 12f is a substantially U-shaped end portion 12g. In this invention, the spring 12 is segmented to allow the extended portions 12e, 12f of the spring 12 to be rotatable relative to the portions 12c, 12d from which they extend. That is, the extended portions 12e, 12f are able to rotate around the respective axes of the portions 12c, 12d, as shown in arrow A (see, FIG. 4). The resilience or elasticity of the spring 12 stem from portions 12c, 12d being elastic (i.e., elastic portions 12c, 12d). More particularly, resilience or elasticity of the spring 12 are provided by the twisting of elastic portions 12c, 12d of the spring 12. That is, each of the elastic portions 12c, 12d acts as a "torsion" spring. Thus, when in the concealed position (i.e., the upper side 30 of the barcode (or QR code) platter 10 being blocked by the CPA device 8, as illustrated in FIGS. 2 and 3, when this invention is being assembled, the elastic portions 12c, 12d will have been twisted, and remain in the twisted states until the invention is in the exposed position when the CPA device 8 is moved forward (i.e., the underside 60 of the platter 10, containing the barcode 50 thereon, is exposed, as illustrated in FIGS. 7 and 8).

Figure 5:
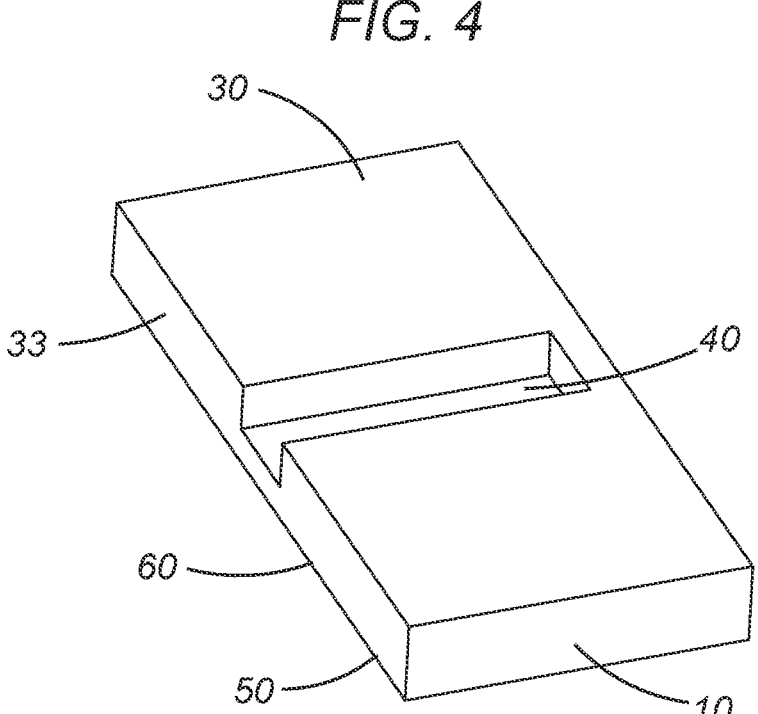
FIG. 5 is a perspective view of the barcode (or QR code) platter showing the upper side thereof and having a groove for receiving therein a portion of the platter-activating spring of this invention.

Alternatively, the resilience or elasticity of the extended portions 12e, 12f relative to the portions 12c, 12d may also be made possible by internal springs (e.g., coil springs or the like) (not shown) inside, for example, the portions 12c, 12d that are attached, at respective ends thereof, to portion 12c and extended portion 12e or to portion 12d and extended portion 12f. The extended portions 12e, 12f, and the end portion 12g of the spring 12 are accommodated within a slot portion 40 on the upper side 30 of the platter 10, as shown in FIG. 5. The extended portions 12e, 12f, and the end portion 12g of the spring 12 may be fixed inside the slot portion 40 on the upper side 30 of the platter 10 by press-fitting, gluing, or the like. When the extended portions 12e, 12f, and the end portion 12g of the spring 12 are fixed inside the slot portion 40 on the upper side 30 of the platter 10, the portions 12c, 12d of the spring 12 may or may not abut against the side 33 (see, FIG. 5) of the platter 10.

Figure 6:
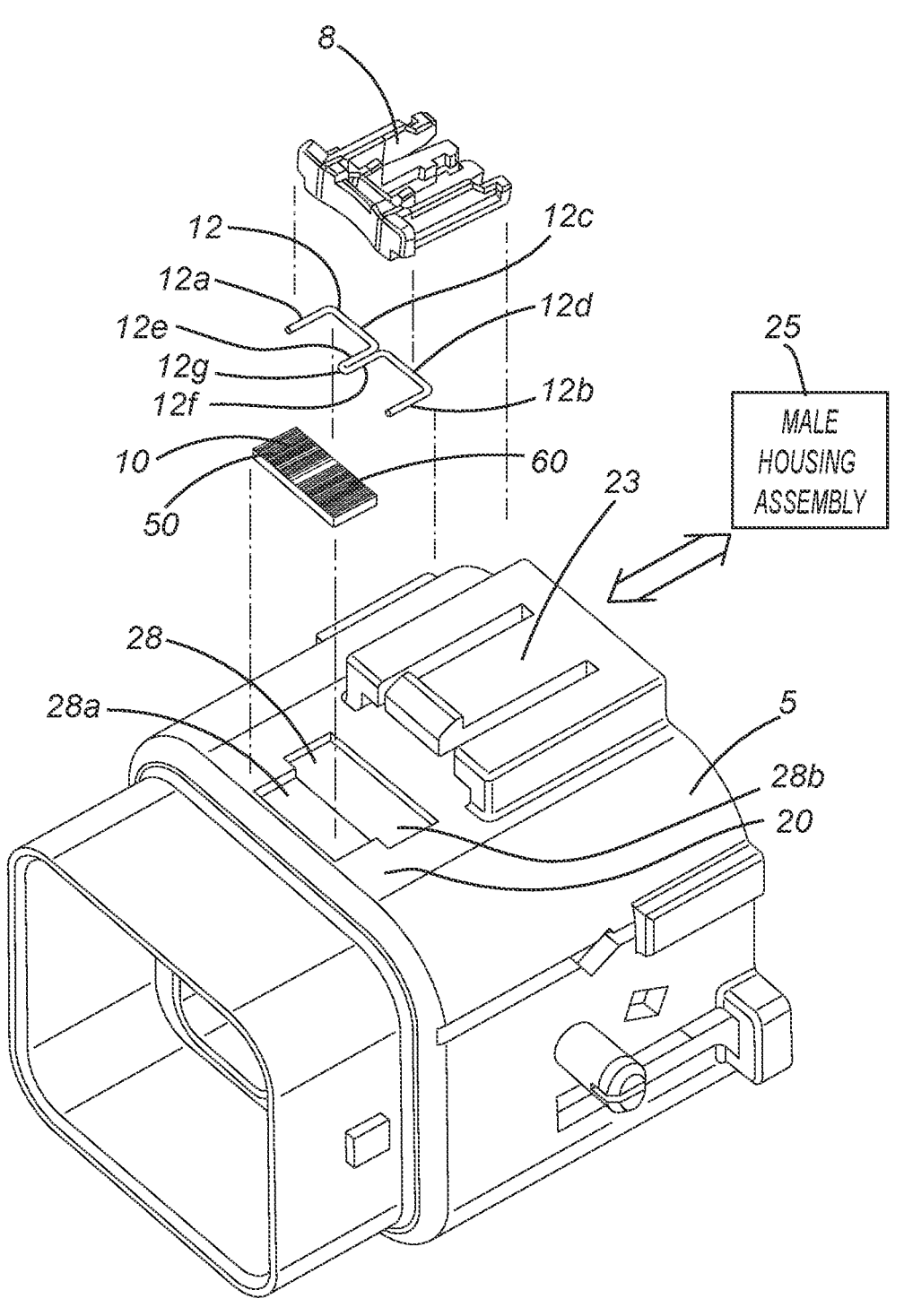
FIG. 6 is a perspective exploded view of the female housing assembly with the CPA device, along with the barcode (or QR code) platter and the platter-activating spring of this invention, the platter and the platter-activating spring being in a position where the female housing assembly is at a locked or mated position with the male housing assembly, the CPA device having moved forward towards the locking position.

FIG. 6 is a perspective exploded view of the female housing assembly 5 with the CPA device 8, along with the barcode (or QR code) platter 10 and the platter-activating spring 12 of this invention, the platter 10 and the spring 12 being in positions where the female housing assembly 5 is at a fully mated position (i.e., fully mated position with the male housing assembly 25) where the CPA device 8 has moved forward towards the lock position. On the upper surface 20 of the female housing assembly 5 is the CPA device retainer 23. Also, on the upper surface 20 of the female housing assembly 5 includes the slot portions 28a, 28b that accommodate therein the spring 12 and the platter 10, as more fully discussed below.

Figure 7:
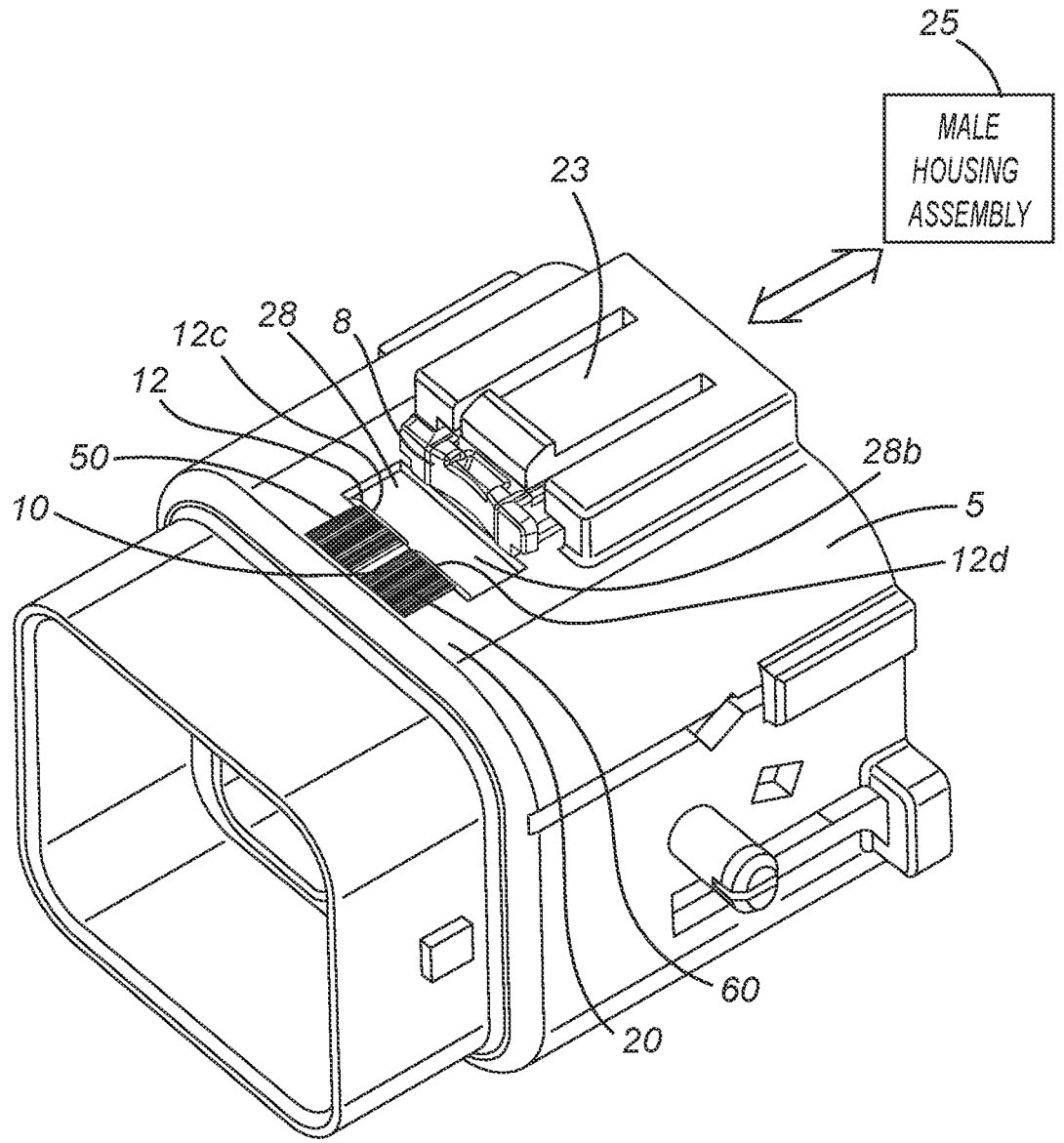
FIG. 7 is a perspective view of the female housing assembly mounted and assembled thereon the CPA device, the barcode (or QR code) platter, and the platter-activating spring, the female housing assembly being at the locked or mated position with the male housing assembly, the CPA device having moved forward towards the locking position with the platter having rotated showing an underside thereof with the barcode shown thereon.
Figure 8:
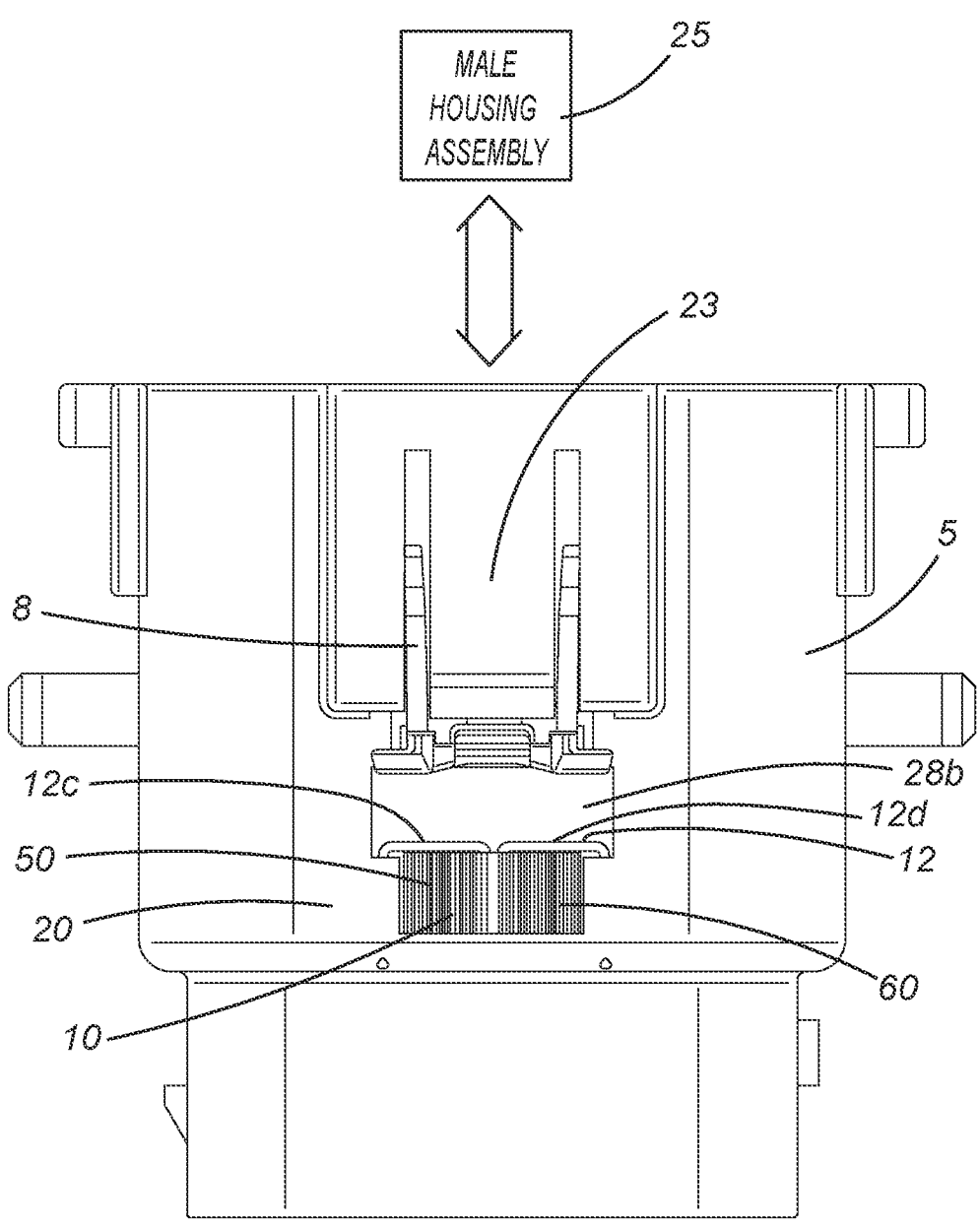
FIG. 8 is a top elevational view of the female housing assembly mounted and assembled thereon the CPA device, the barcode (or QR code) platter, and the platter-activating spring, the female housing assembly being at a locked or mated position with the male housing assembly, the CPA device having moved forward towards the locking position with the platter having rotated showing the underside thereof with the barcode shown thereon.

FIG. 7 is a perspective view of the female housing assembly 5 mounted and assembled thereon the CPA device 8, the barcode (or QR code) platter 10, and the platter-activating spring 12, the female housing assembly 5 being at the fully-mated position (i.e., fully-mated position with the male housing assembly 25) with the CPA device 8 having moved forward towards the lock position with the underside 60 (having the barcode 50 thereon) of the platter 10 being revealed or shown. More particularly, the barcode 50 is revealed when the CPA device 8 has moved forward, such that in this invention, the indicating feature (barcode 50) is the same structure as the concealing feature (rotatable barcode platter 10). In other words, the concealing feature of this invention (i.e., the platter 10) and the indicating feature (i.e., the barcode 50) are of one and the same structure, and thus, do not move relative to each other (i.e., no relative motion between the two) because the barcode 50 is part of the rotatable barcode platter 10. With the CPA device 8 having moved forward, the previously partially covered upper side 30 of the platter 10 (see, FIGS. 2 and 3) becomes uncovered or unblocked, thereby freeing or activating the platter 10, and allowing it to rotate from the slot portion 28b to the slot portion 28a of the upper surface 20 of the female housing assembly 5. The rotatable movement of the platter 10 from the slot portion 28b to the slot portion 28 is, as discussed earlier, made possible by the extended portions 12e, 12f and the end portion 12g of the spring 12 being attached inside the slot portion 40 on the upper side 30 of the platter 10, as shown in FIG. 5; and the extended portions 12e, 12f being able to respectively rotate around the longitudinal axes of the portions 12c, 12d of the spring 12.

FIG. 8 is a top elevational view of the female housing assembly 5 mounted and assembled thereon the CPA device 8, the barcode (or QR code) platter 10, and the platter-activating spring 12, the female housing assembly 5 being at a fully locked or fully mated position (i.e., fully locked or fully mated position with the male housing assembly 25) with the CPA device 8 having moved forward towards the lock position with the underside 60 (having the barcode 50 thereon) of the platter 10 being shown. As illustrated in FIG. 8, the CPA device 8 no longer covers the upper side 30 of the platter 10 (see, FIG. 3), and more importantly no longer blocks or prevents the spring-activated barcode platter 10 from rotating towards the slot portion 28b to the slot portion 28a of the slot 28 on the upper surface 20 of the female housing assembly 5, and thereafter allows or activates the platter 10 to rotate from the slot portion 28b to the slot portion 28a of the slot 28 on the upper surface 20 of the female housing assembly 5. With the CPA device 8 no longer blocking the barcode platter 10 and thereby releasing the barcode platter 10, the spring-activated barcode platter 10 rotates from the slot 28b towards the slot 28a of the upper surface 20 of the female housing assembly 5, thereby revealing the barcode 50 on the underside 60 of the platter 10, the barcode acting as the indicating feature of this invention. This indicating feature, in its entirety, of the invention indicates that the CPA device 8 has moved forwards towards the lock position, and the CPA device 8 is at a full-lock position, which means that the female housing assembly 5 and the male housing assembly 25 have fully mated and at a fully locked or mated position.

Figure 9:
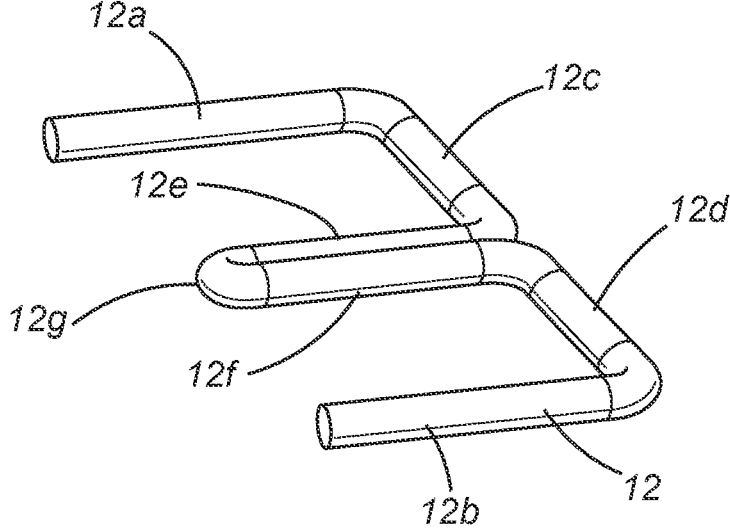
FIG. 9 is a perspective view of the platter-activating spring of this invention having rotated at a position whereby the underside of the platter has exposed or revealed the barcode or QR code thereon.

FIG. 9 is a perspective view of the spring 12 of this invention whereby the extended portions 12e, 12f and the end portion 12g of the spring 12 have resiliently rotated inward, as illustrated in the position shown in FIG. 9. At this position, as shown in FIG. 9, the extended portions 12e, 12f and the end portion 12g of the spring 12 rotate the platter 10 so as to reveal the barcode 50 that is on the underside 60 of the platter 10. That is, in this invention, the extended portions 12*e*, 12*f* of the spring 12 are rotatable relative to the portions 12*c*, 12*d* from which they respectively extend (see, arrow A in FIG. 4).

As discussed above, the resilience or elasticity of the spring 12 stem from portions 12*c*, 12*d* being elastic (i.e., elastic portions 12*c*, 12*d*). More particularly, resilience or elasticity of the spring 12 are provided by the twisting of elastic portions 12*c*, 12*d* of the spring 12. That is, each of the elastic portions 12*c*, 12*d* acts as a "torsion" spring. Thus, when in the concealed position (i.e., the upper side 30 of the barcode (or QR code) platter 10 being blocked by the CPA device 8, as illustrated in FIGS. 2 and 3, when this invention is being assembled, the elastic portions 12*c*, 12*d* will have been twisted, and remain in the twisted states until the invention is in the exposed position when the CPA device 8 is moved forward (i.e., the underside 60 of the platter 10, containing the barcode 50 thereon, is exposed, as illustrated in FIGS. 7 and 8).

Figure 10:
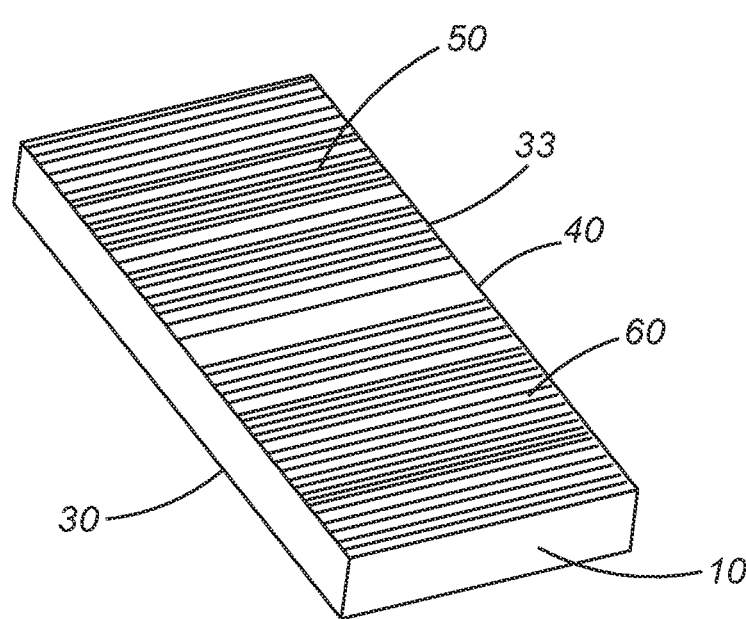
FIG. 10 is a perspective view of the barcode (or QR code) platter having rotated and in a position showing the underside thereof with the barcode thereon.

Alternatively, the resilience or elasticity of the extended portions 12*e*, 12*f* relative to the portions 12*c*, 12*d*, respectively, may also be made possible by internal springs (e.g., coil springs or the like) (not shown) inside, for example, the portions 12*c*, 12*d* that are attached, at respective ends thereof, to portion 12*c* and extended portion 12*e* or to portion 12*d* and extended portion 12*f*. That is, the extended portions 12*e*, 12*f* are able to rotate around the respective axes of the portions 12*c*, 12*d*, as shown in arrow A in FIG. 4. Once rotated, the barcode 50 becomes revealed on the slot 28*a*, this results in allowing the barcode (on the underside 60 of the platter 10) (See, FIG. 10.) Once the barcode 50 has been revealed, this condition or position indicates or signifies that the CPA device 5 of this invention has fully moved forward towards the lock position, thereby placing the female housing assembly 5 and the male housing assembly 25 at a position of being fully locked or mated together.

The rotatable barcode or QR code platter 10 is activated or made operable by the spring 12 described herein (and illustrated in FIGS. 4 and 9), although the activation of the rotatable barcode or QR code platter 10 is not limited to the use of the spring 12 of the type used and described in this invention. Alternatively, a coil spring or a combination of coil springs, operably coupled to the platter 10 and a CPA device 8, may be used for the spring in this invention. Also, instead of the type of spring used and described in this invention, or the above-mentioned coil spring or a combination of coil springs, a mechanical linkage 80, operably coupled to the platter 10 and a CPA device 8, may also be used.

Figures 11A, 11B:
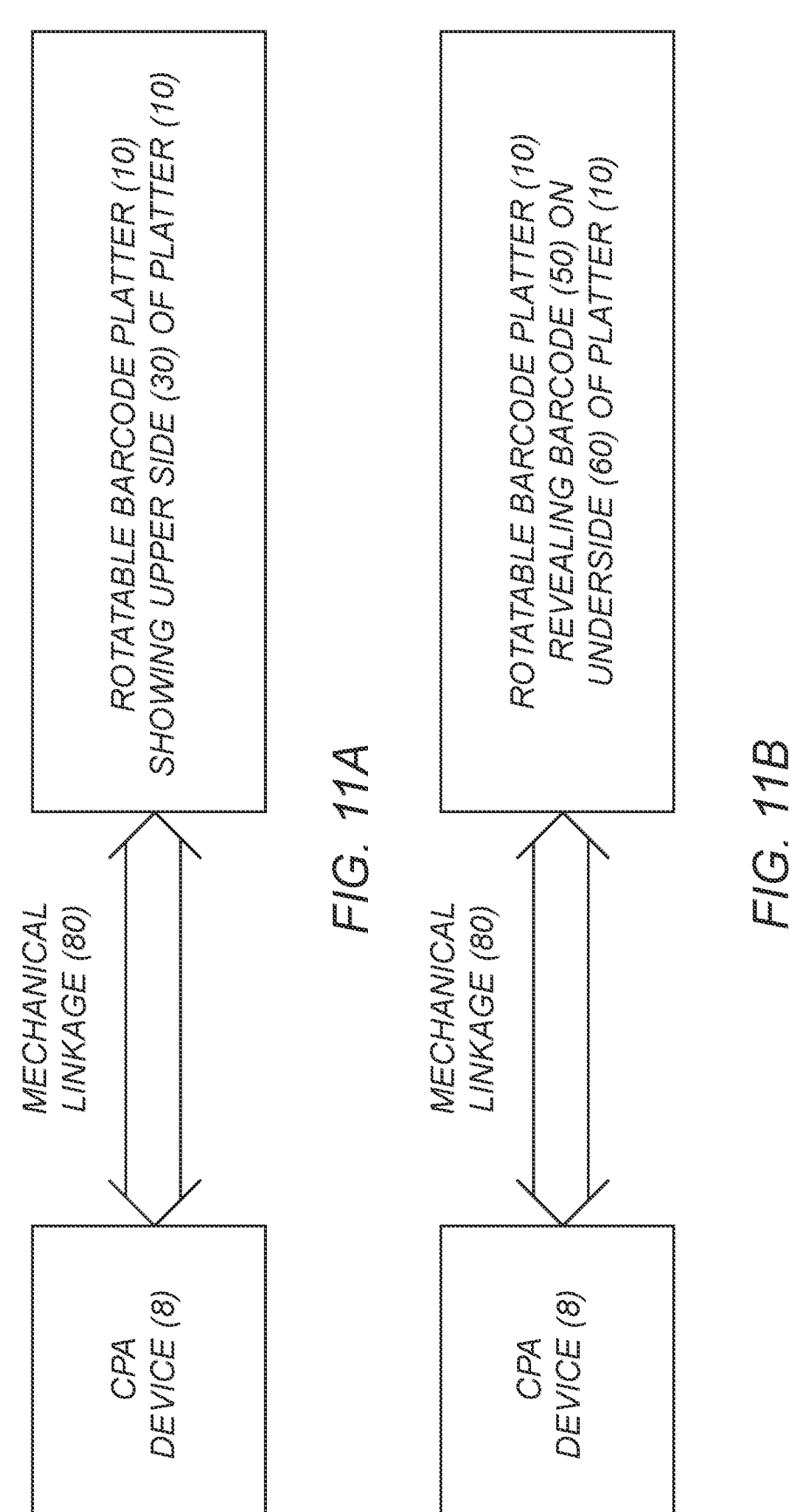
FIG. 11A is a block box figure schematically showing the use of a mechanical linkage between the CPA device and the barcode (or QR code) platter when the rotatable barcode (or QR code) platter shows its upper side (concealing feature).
FIG. 11B is a block box figure schematically showing the use of the mechanical linkage between the CPA device and the barcode (or QR code) platter when the rotatable barcode (or QR code) platter shows its underside thereof whereby the barcode thereon is revealed or exposed (indicating feature).

FIG. 11A is a block box figure schematically showing the use of a mechanical linkage 80 (instead of the platter-activating spring 12) operably connected between the CPA device 8 and the barcode or QR code platter 10 when the rotatable barcode or QR code platter 10 shows its upper side 30 (concealing feature). FIG. 11B is a block box figure schematically showing the use of the mechanical linkage 80 operably connected between the CPA device 8 and the barcode or QR code platter 10 in rotating the platter 10, with the mechanical linkage 80, from the concealing feature to the indicating feature when the rotatable barcode or QR code platter 10 shows its underside thereof wherein the barcode thereon is revealed or exposed.

The present invention is not limited to the above-described embodiments; and various modifications in design, structural arrangement or the like may be used without departing from the scope or equivalents of the present invention.

I claim:

1. A releasable barcode or QR code for indicating mating, when the releasable barcode or QR code is exposed, or non-mating, when the releasable barcode or QR code is concealed, of two elements, comprising:

a concealing feature which indicates the non-mating of said two elements;

an indicating feature which, in its entirety, indicates the mating of said two elements, wherein said concealing feature and said indicating feature are one and of a same structure with no relative motion between said concealing feature and said indicating feature, wherein said same structure on which said concealing feature and said indicating feature are located is a rotatable platter, wherein said concealing feature is an upper side of said rotatable platter, and wherein said indicating feature is an underside of said rotatable platter having said barcode or QR code thereon.

2. The hidden releasable barcode or QR code for indicating mating or non-mating of said two elements according to claim 1, wherein said rotatable platter is mounted onto an upper surface of a female housing assembly.

3. The hidden releasable barcode or QR code for indicating mating or non-mating of said two elements according to claim 2, wherein said two elements are comprised of a female housing assembly and a male housing assembly.

4. The hidden releasable barcode or QR code for indicating mating or non-mating of said two elements according to claim 3, wherein said rotatable platter is mounted onto said upper surface of said female housing assembly, along with a spring operably connected to said rotatable platter.

5. The hidden releasable barcode or QR code for indicating mating or non-mating of said two elements according to claim 4, wherein said concealing feature is maintained by a CPA device, above said upper side of said platter, being unable to move forward towards a locking position.

6. The hidden releasable barcode or QR code for indicating mating or non-mating of said two elements according to claim 5, wherein when said CPA device is unable to move forward towards said locking position, said upper side of said platter is blocked and said spring is prevented from rotating said platter from its upper side to its underside containing thereon said barcode or QR code.

7. The hidden releasable barcode or QR code for indicating mating or non-mating of said two elements according to claim 5, wherein when said CPA device is allowed to move forward towards said locking position, said upper side of said platter becomes unblocked and said spring rotates said platter from its upper side to its underside containing thereon said barcode or QR code.

8. The hidden releasable barcode or QR code for indicating mating or non-mating of said two elements according to claim 3, wherein said rotatable platter is mounted onto said upper surface of said female housing assembly, along with a mechanical linkage operably connected to and between said CPA device and said rotatable platter.

9. The hidden releasable barcode or QR code for indicating mating or non-mating of said two elements according to claim 8, wherein said concealing feature is maintained by a CPA device, above said upper side of said platter, being unable to move forward towards a locking position.

10. The hidden releasable barcode or QR code for indicating mating or non-mating of said two elements according to claim 9, wherein when said CPA device is unable to move forward towards said locking position, said upper side of said platter is blocked and said spring is prevented from rotating said platter from its upper side to its underside containing thereon said barcode or QR code.

11. The hidden releasable barcode or QR code for indicating mating or non-mating of said two elements according to claim 10, wherein when said CPA device is allowed to move forward towards said locking position, said upper side of said platter becomes unblocked and said spring rotates said platter from its upper side to its underside containing thereon said barcode or QR code.

12. A method for operating a releasable barcode or QR code for indicating mating, when the releasable barcode or QR code is exposed, or non-mating, when the releasable barcode or QR code is concealed, of two elements, comprising the steps of:

provides a concealing feature which indicates the non-mating of said two elements; and providing an indicating feature which, in its entirety, indicates the mating of said two elements, wherein said concealing feature and said indicating feature are one and of a same structure with no relative motion between said concealing feature and said indicating feature, wherein said same structure on which said concealing feature and said indicating feature are located is a rotatable platter, wherein said concealing feature is an upper side of said rotatable platter, and wherein said indicating feature is an underside of said rotatable platter having said barcode or QR code thereon.

13. The method for operating said hidden releasable barcode or QR code for indicating mating or non-mating of said two elements according to claim 12, wherein said two elements include a female housing assembly and a male housing assembly, wherein said concealing feature includes an upper side of a rotatable platter, wherein said indicating feature includes an underside of said rotatable platter, and wherein said step of providing said concealing feature includes a step of preventing a CPA device from moving forward towards a lock position, said concealing feature indicating that said female housing assembly and said male housing assembly are at a pre-lock or pre-mate position.

14. The method for operating said hidden releasable barcode or QR code for indicating mating or non-mating of said two elements according to claim 13, wherein said step of providing said indicating feature includes a step of allowing said CPA device to move forward towards a lock position, said indicating feature indicating that said female housing assembly and said male housing assembly are at a full-lock or full-mate position.

15. The method for operating said hidden releasable barcode or QR code for indicating mating or non-mating of said two elements according to claim 13, wherein said step of providing said indicating feature includes the steps of allowing said CPA device to move forward towards a lock position, and allowing said platter to rotate from an upper side of said platter to an underside of said platter having said barcode or QR code thereon.

16. The method for operating said hidden releasable barcode or QR code for indicating mating or non-mating of said two elements according to claim 15, wherein said step of providing said indicating feature includes the step of providing a spring for rotating said platter from its upper side to its underside having said barcode or QR code thereon.

17. The method for operating said hidden releasable barcode or QR code for indicating mating or non-mating of said two elements according to claim 15, wherein said step of providing said indicating feature includes the step of providing a spring for rotating said platter from its upper side to its underside having said barcode or QR code thereon, said spring being at least one of a torsion spring, a coil spring, and combination of coil springs operably coupled to said CPA device and said platter.

18. The method for operating said hidden releasable barcode or QR code for indicating mating or non-mating of said two elements according to claim 15, wherein said step of providing said indicating feature includes the step of providing a mechanical linkage for rotating said platter from its upper side to its underside having said barcode or QR code thereon.

19. The method for operating said hidden releasable barcode or QR code for indicating mating or non-mating of said two elements according to claim 18, wherein mechanical linkage is operably coupled to said CPA device and said platter.

20. A releasable barcode or QR code for indicating mating, when the releasable barcode or QR code is exposed to a detector, or non-mating, when the releasable barcode or QR code is, in its entirety, concealed from the detector, of two elements, comprising:

a concealing feature which indicates the non-mating of said two elements;

an indicating feature which, in its entirety, indicates the mating of said two elements, wherein said concealing feature and said indicating feature are one and of a same structure with no relative motion between said concealing feature and said indicating feature, wherein said same structure on which said concealing feature and said indicating feature are located is a rotatable platter, wherein said concealing feature is an upper side of said rotatable platter, and wherein said indicating feature is an underside of said rotatable platter having said barcode or QR code thereon.

21. A method for operating a releasable barcode or QR code for indicating mating, when the releasable barcode or QR code is exposed to a detector, or non-mating, when the releasable barcode or QR code is, in its entirety, concealed from the detector, of two elements, comprising the steps of:

providing a concealing feature which indicates the non-mating of said two elements; and providing an indicating feature which, in its entirety, indicates the mating of said two elements, wherein said concealing feature and said indicating feature are one and of a same structure with no relative motion between said concealing feature and said indicating feature, wherein said same structure on which said concealing feature and said indicating feature are located is a rotatable platter, wherein said concealing feature is an upper side of said rotatable platter, and wherein said indicating feature is an underside of said rotatable platter having said barcode or QR code thereon.

* * * * *